May 13, 1969 L. SCHWAB 3,443,366
FILTER ASSEMBLAGE
Filed Oct. 5, 1967
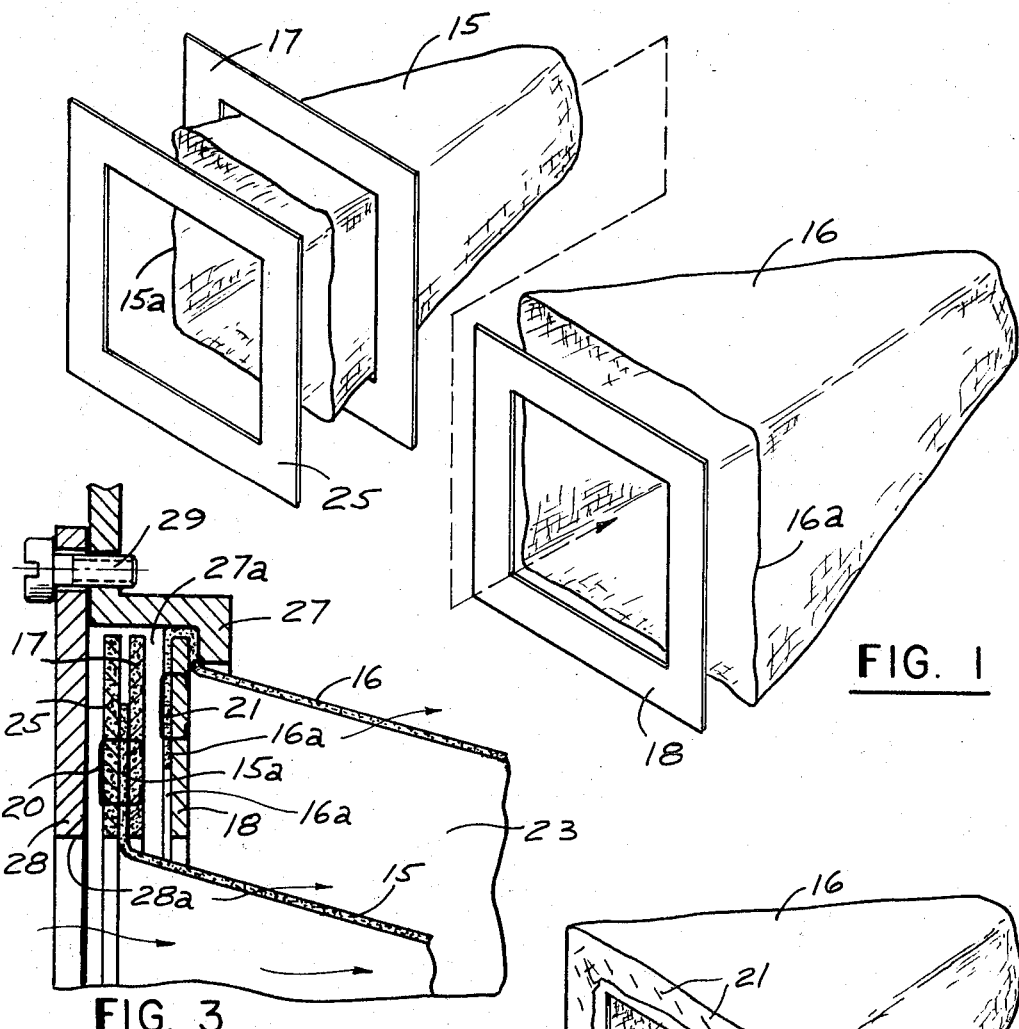
FIG. 1
FIG. 3
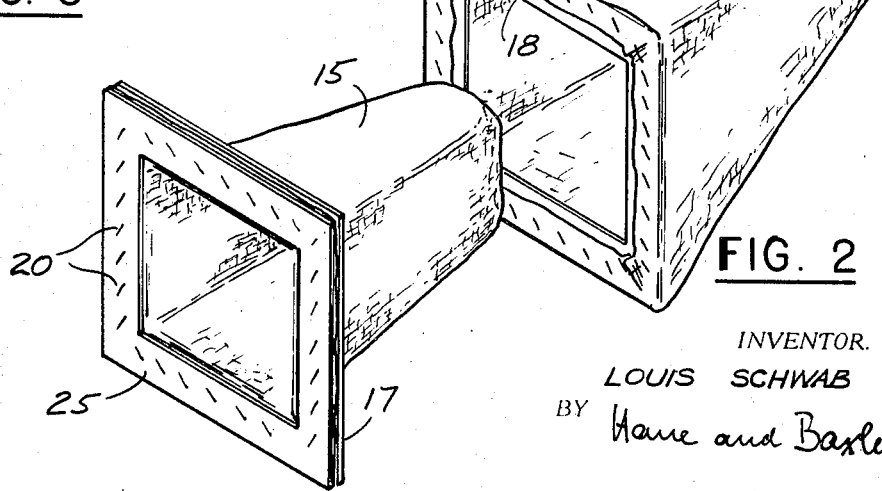
FIG. 2
INVENTOR.
LOUIS SCHWAB
BY Hauve and Baxley
ATTORNEYS

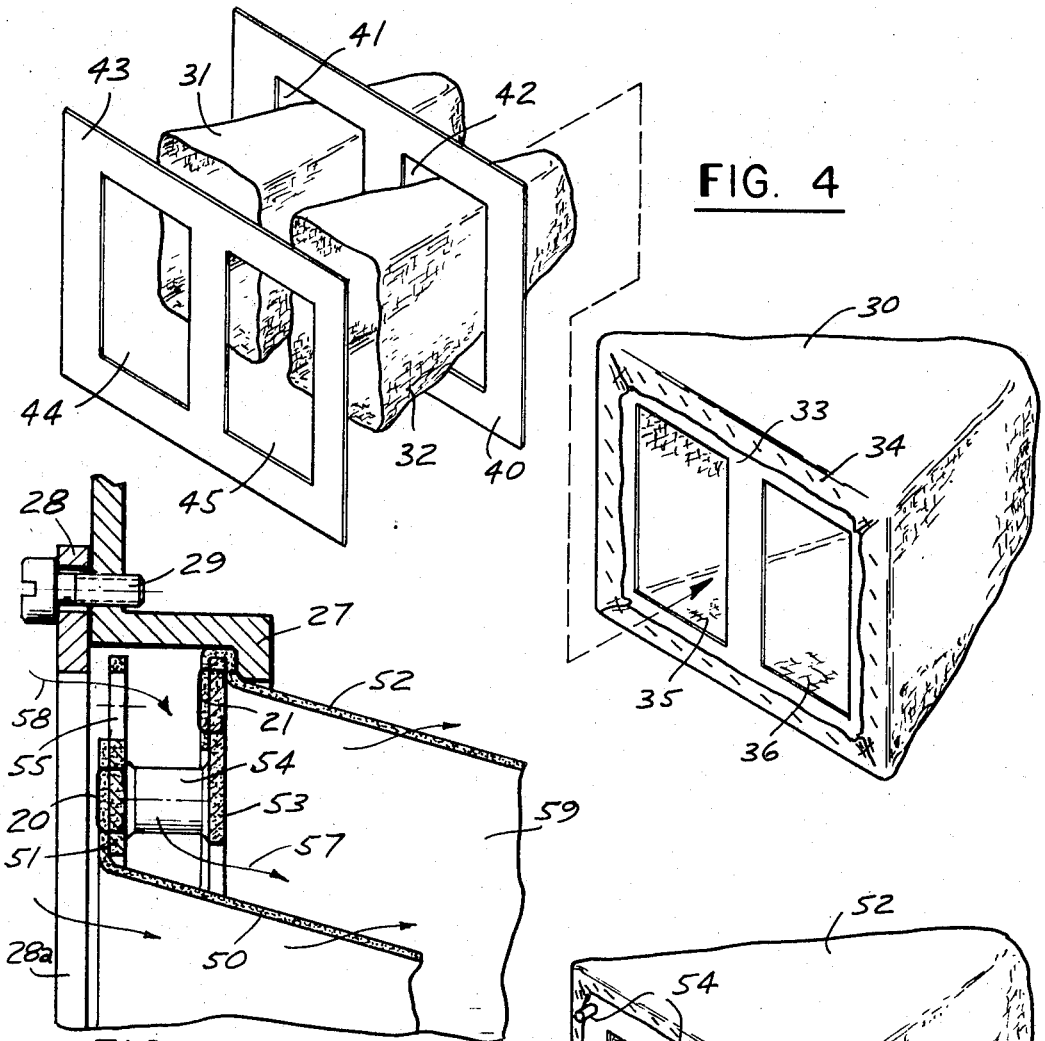
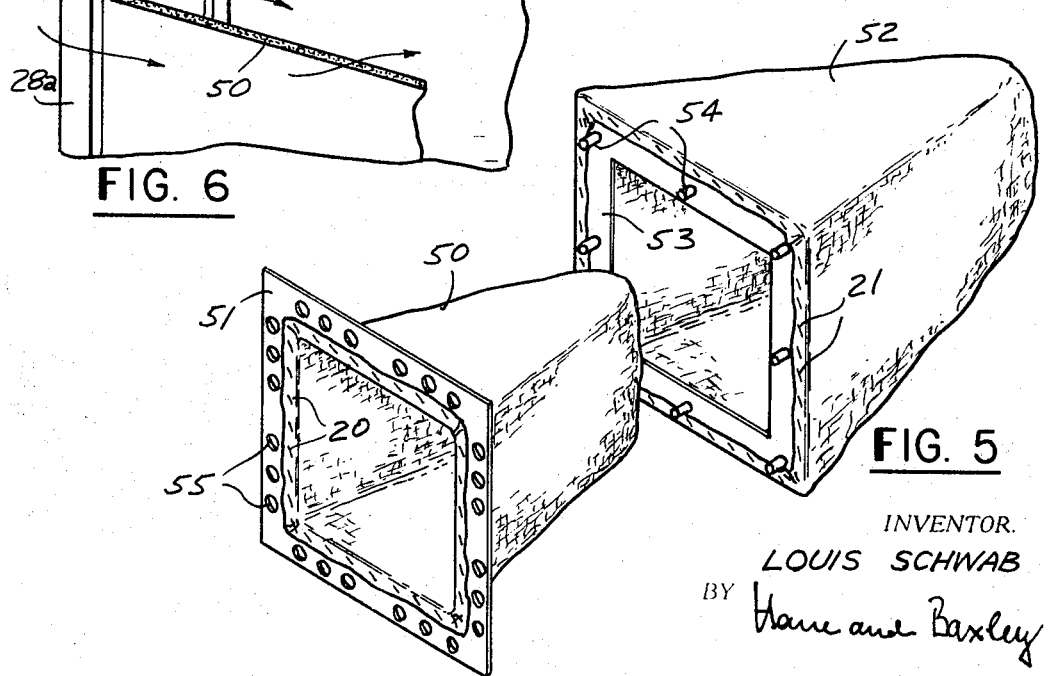

May 13, 1969  L. SCHWAB  3,443,366
FILTER ASSEMBLAGE
Filed Oct. 5, 1967  Sheet 3 of 4

INVENTOR.
LOUIS SCHWAB
BY Harris and Baxley
ATTORNEYS

United States Patent Office 3,443,366
Patented May 13, 1969

3,443,366
FILTER ASSEMBLAGE
Louis Schwab, P.O. Box 575, Miami Beach, Fla. 33139
Filed Oct. 5, 1967, Ser. No. 673,137
Int. Cl. B01d 29/12, 27/10, 25/02
U.S. Cl. 55—309                5 Claims

ABSTRACT OF THE DISCLOSURE

There is disclosed a filter assemblage for separating solid particles entrained in a flow of air in which one or several pairs of an inner or prefilter and an outer or main filter are independently supported in operational nested position so that the inner filter can be conveniently withdrawn from the outer filter for replacement. The inner or prefilter and the outer or main filter are supported in operational nested relationship by superimposed frames and a bypass through the frame for the inner filter and past the frame for the outer filter provides for part of the total air flow a direct flow path into the outer filter. This bypass flow diverts a substantial portion of the total load from the inner filter to the outer filter by the suction or syphoning action of the air flow through the bypass.

---

The present invention relates to a filter assemblage for separating solid particles such as dust entrained in a flow of a gaseous fluid such as air. More particularly, the invention relates to a filter assemblage in which an inner or prefilter is nested in an outer or main filter in spaced-apart relationship, both filters being made of an air permeable not-form retaining material, such as fabric.

It is a broad object of the invention to provide a novel and improved filter assemblage of the general kind above referred to in which the inner filter and the outer filter are independently supported in operational relationship. Such an arrangement has the advantage that the inner filter can be conveniently removed by simply pulling the inner filter out of the outer filter. A fresh inner filter can be similarly conveniently inserted by nesting the fresh filter into the outer filter.

As is evident, replacement of a filter is necessary when the particle accumulations at the filter reach a level such that the pressure drop between the upstream and the downstream side of the filter exceeds an acceptable value, and practical experience with filter assemblages of the kind herein referred to shows that the inner or prefilter requires a more frequent replacement than the outer or main filter.

Due to the independent support of the two filters, it is of course, also conveniently possible to replace the outer filter only or both filters as required by the operational condition of the filters.

A more specific object of the invention is to provide a novel and improved filter assemblage of the general kind above referred to in which the intake opening of each filter is held in a position such that the intake opening of the filter has a fixed effective area and in which the two filters of the assemblage are positively but independently held in nested operational positions by superimposing the two frames.

Another more specific object of the invention is to provide a novel and improved filter assemblage of the general kind above referred to in which the intake ends of several inner filters are mounted on a common frame and similarly, the intake end of the outer filter is mounted on a second common frame. Such arrangement permits rapid assembly and disassembly of multiple filter installations by placing the common frame for the inner filters in superimposition with the common frame for the outer filter. If the inner filters are to be replaced by fresh filters, the respective common frame is simply detached from the common frame of the outer filter.

It is a further object of the invention to provide a novel and improved filter assemblage of the general kind above referred to in which the inner filter and the outer filter are independently supported by superimposed frames of sufficient rigidity and a bypass leads past or through the frames directly into an air space between the inner filter and the outer filter. Such an arrangement has the advantage that a substantial part of the total air flow is deflected into the outer filter due to the syphoning or suction action of the air flow through the bypass.

Extensive tests have shown that due to such distribution of the total load between the inner filter and the outer filter, the useful life of both filters is markedly prolonged, as will be more fully explained hereinafter.

A further more specific object of the invention is to provide a novel and improved filter assemblage of the general kind above referred to in which the bypass leading into the air space between the outer filter and the inner filter is formed by giving the frame supporting the inner filter a concave curvature in reference to a flat frame supporting the outer filter.

Other and further objects, features and advantages of the invention will be pointed out hereinafter and set forth in the appended claims constituting part of the application.

In the accompanying drawing, several preferred embodiments of the invention are shown by way of illustration and not by way of limitation.

In the drawing:

FIG. 1 is a perspective exploded view of a filter assemblage including an inner or prefilter and an outer or main filter;

FIG. 2 is a perspective view similar to FIG. 1, but showing the inner filter ready for nesting in the outer filter;

FIG. 3 is a fragmentary section of a filter assemblage according to the invention installed in a holder;

FIG. 4 is a perspective partly exploded view of a multiple filter assemblage including inner and outer filters to be nested in each other;

FIG. 5 is a perspective, partly exploded view of a modified filter assemblage according to the invention;

FIG. 6 is a fragmentary sectional view of the filter assemblage shown in FIG. 5 in fully assembled condition;

FIG. 2 is another modification of a filter assemblage with bypass; and

Figure 7:
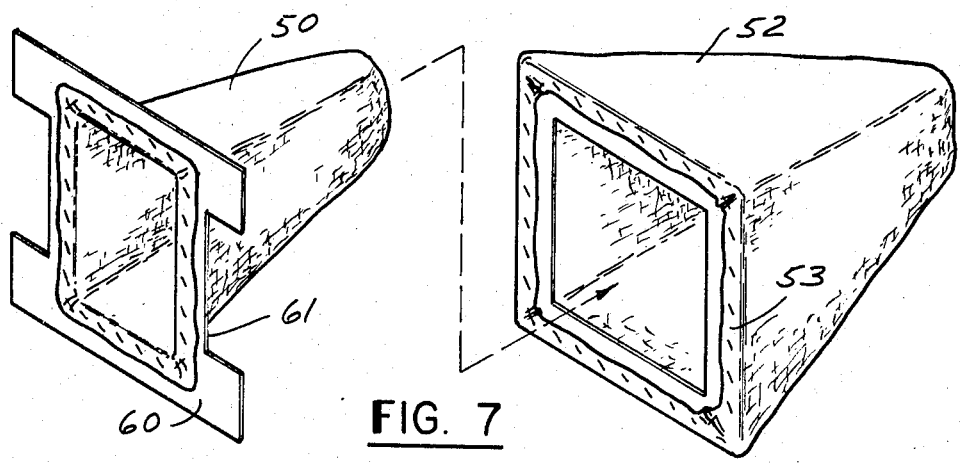
FIG. 7 is a perspective exploded view of a filter assemblage with bypass leading into the space between the inner and the outer filter.

Referring now to FIGS. 1, 2 and 3 more in detail, the filter assemblage as exemplified in these figures comprises an inner filter 15 and an outer filter 16. Both filters are shown as having a generally frusto-conical or bluntly tapered configuration, but many other configurations such as a wedge-shaped configuration are also suitable. The filters are made of a pliable or soft, that is, not form retaining suitable material such as Dynel industrial cloth, nylon cloth or reinforced cotton fabric. If desired, the filter material can be flame-proofed by techniques suitable for the purpose. The density of the material is selected in accordance with the particular fluid flow to be purified and the acceptable pressure drop between the upstream side and the downstream side of the filters. Generally, the outer filter has a higher density than the inner filter.

The wide end 15a and 16a respectively, constitutes the intake end of the filters. The intake end 15a of filter 15 is secured to a frame 17 and similarly, the intake end 16a of filter 16 is secured to a frame 18. The frames are made of any material of sufficient rigidity such as hard or pressed cardboard, plastic or sheet metal. It is only essential that the frame material is inexpensive since the frames, together with the respective filters, constitute throw-away components, as will be more fully explained hereinafter. The opening defined by the frames should approximately match the peripheral outline of the intake end of the respective filter. The outer peripheral outline of the frames may basically take any shape, but in practice a rectangular outline as shown is advantageous since such outline facilitates mounting of a plurality of filter assemblages in close side-by-side arrangement.

Each filter is secured to its frame by any suitable fastening means, for instance, by gluing, but it has been found preferable and inexpensive to secure the turned-over rims of the intake ends 15a and 16a of the filters to the frames by stapling. Staples 20 for securing filter 15 to frame 17 and staples 21 for securing filter 16 to frame 18 are shown in FIG. 3. This figure also shows that filter 15 is secured to frame 17 by turning its open end 15a about the peripheral edge of the opening of the frame while filter 16 is secured to frame 18 by turning the open end 16a of the filter about the outer peripheral edge of the frame. As a result, an air space 23 is formed between the two filters when the same are nested into each other, as is shown in FIG. 3.

Nesting of the two filters after being secured to the frames, as is shown in FIG. 2, is effected in a very simple manner by pushing the inner filter into the outer filter, that is, into the position shown in FIG. 3. As may be noted from this figure, frames 17 and 18 are disposed in superimposition when the two filters are nested, thereby retaining the two filters in the operational position.

To protect the mounting of the rim of filter 15 on frame 17 and also to enhance the ornamental appearance of the filter assemblage, a cover plate 25 may be secured to the outside of frame 17. Staples 20 may be conveniently used to secure the cover plate to frame 17 simultaneously with the attachment of filter 15 to frame 17.

A plurality of filter assemblages as hereindescribed may be fitted as units side-by-side in recesses 27a of a holding frame 27, only partly shown. A frame plate 28 having a suitable opening 28a for passage of the air flow or other flow to be purified into inner filter 15 serves to secure the filter assemblies in recesses 27a. A common cover plate may be used for all the filter assemblages fitted in the holder and secured either by screws 29 or other suitable fastening means.

The function of the filter assemblage as hereinbefore described is evident. A substantial portion of the discrete particles entrained in the flow directed upon inner filter 15 will be trapped by this filter. The now partly purified flow will then pass through air space 23 and outer filter 16, which entraps most or all of the remaining particles entrained in the flow.

The filter assemblage according to FIG. 4 is similar in principle to the previous described filter assemblage except that an outer filter 30 is common to two inner filters 31 and 32. The configuration of filter 30 and the material from which it is made should be visualized as being substantially the same as that of the outer filter previously described. The intake end of filter 30 is secured to a frame 33 by suitable means indicated by staples 34, but instead of defining a single intake opening, frame 33 defines two intake openings 35 and 36 respectively, one for each of inner filters 31 and 32. The intake ends of the inner filters are ecured to a frame 40 similar to frame 33 in that the frame defines two openings 41 and 42, one for each of filters 31 and 32. The inner filters should be visualized as being secured to frame 40 by suitable means such as stapling.

As is shown in FIG. 4, the outer filter is wrapped around the outside edge of frame 33 while filters 31 and 32 are wrapped about the inner edges of frame openings 41 and 42 to define air spaces between the outer filter and the inner filters, as has been described in connection with FIG. 3.

A cover plate 43, also defining two openings 44 and 45, is fitted upon the outside of frame 40 similar to plate 25 shown in FIGS. 2 and 3.

The assembly of the arrangement of FIG. 4 is evident from the previous description. The inner filters are simply pushed into the outer filter.

In the aforedescribed exemplifications of the invention, the inner filter is held in position in reference to the outer filter by being nested in the same and by the superimposition of the frames of the two filters, but is not secured to the outer filter. Accordingly, the inner filter when clogged by accumulation of particles to an extent that it is no longer sufficiently efficient or when the pressure drop between the upstream side and the downstream side of the filter becomes too high, can simply be pulled out of the outer filter for replacement by a fresh filter after removing masking or cover plates 28 and 25. It is, of course, also possible to replace the inner filter in a similarly convenient manner by pulling out both filters out of the holder, exchanging the spent outer filter for a fresh one and reinserting the new one in nested position. The no longer serviceable filters are discarded.

As is further apparent from the previous description, the entire air or other flow to be purified must pass through the inner filter before reaching the outer filter. In other words, the inner filter constitutes the prefilter and the outer filter the main filter of the assemblage.

Turning now to FIGS. 5 and 6, these figures show an exemplification of the invention which is similar in principle to the previously described exemplications except that the total flow to be purified is divided into two flows, one flow first passing through the inner or prefilter and the other directly through the outer or main filter.

The inner filter 50 of the assemblage is wrapped at its intake end about the inner edge of the opening of a frame 51 secured thereto as previously described. Similarly, the outer filter 52 is wrapped about the outside edge of a frame 53 secured thereto as also previously described.

In contrast to the previously described assemblages, the two frames 51 and 53 do not rest upon each other or are close to each other when the inner filter is nested within the outer filter, but are spaced by a plurality of spacer elements shown as pins 54. These pins hold the two frames in the positions of FIG. 6. Frame 51 includes a plurality of holes 55 so that a bypass is formed which, as indicated in FIG. 6 by arrows 57 and 58, leads through holes 55 into an air space 59 between inner filter 50 and outer filter 52.

As is evident, part of the total air or other flow directed upon the filter assemblage flows through opening 28a of cover plate 28 and the opening of frame 51 into inner filter 50, and another part will flow directly through holes 55 in frame 51 and past frame 53 into air space 59. This bypass flow will divert by its suction or syphoning action some of the flow from the inner filter to the bypass flow, thereby distributing the total flow load so that a larger part of the total flow passes through the bypass than corresponds to the ratio of the areas of the opening leading into the inner filter and the holes leading to the bypass.

Tests have shown that if the full flow load is permitted to impinge upon the inner filter, which is usually coarser than the outer filter as previously mentioned, a substantial portion of the particles to be liberated will penetrate the inner filter and are trapped by the outer filter. As a result, the outer filter becomes clogged in a comparatively short time and the filtering capability of the inner filter is not fully utilized. Tests with a filter assemblage according to FIGS. 5 and 6 have shown that when part of the total flow is diverted by a bypass to impinge directly upon the outer filter, the total useful life of both filters for a given flow volume is markedly increased.

Figure 8:
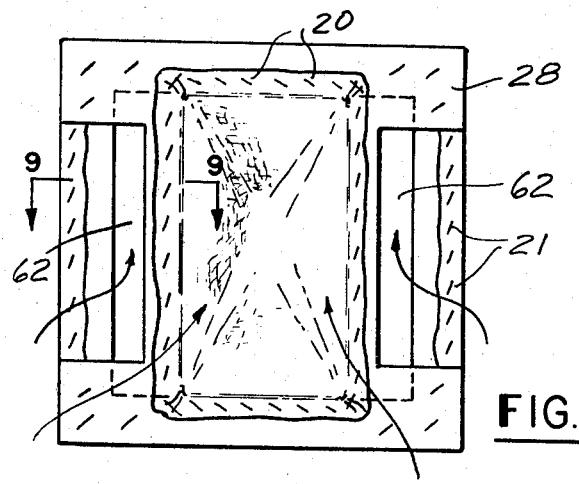
FIG. 8 is a front view upon the filter assemblage according to FIG. 7 in fully assembled condition.
Figure 9:
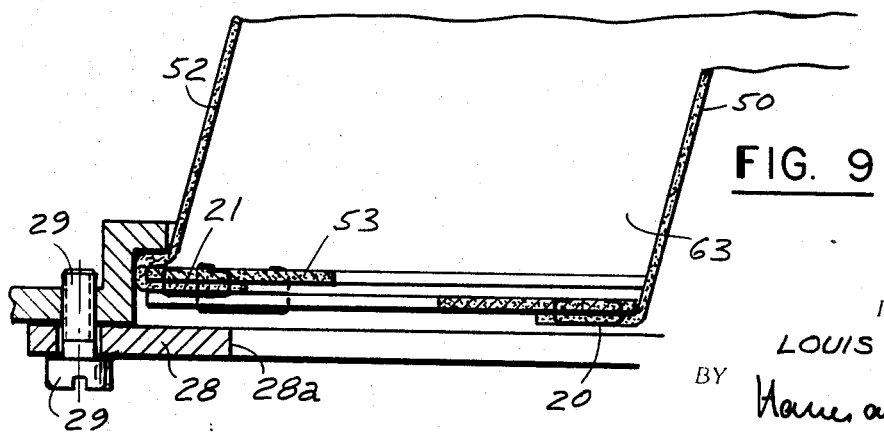
FIG. 9 is a section taken on line 9—9 of FIG. 8 on an enlarged scale.

FIGS. 7, 8 and 9 show a filter assemblage in which the bypass effect is obtained by providing a frame 60 which mounts inner filter 50 as previously described, and has a cut-out or recess 61 in one or several of its sides. The depth of this cut-out in relation to the width of frame 53 to which outer filter 52 is secured, in such that when the two filters are nested and the two frames are placed in superimposition as previously described and shown in FIGS. 8 and 9, a gap 62 is defined by the two filters. This gap permits a direct access of part of the flow into an air space 63 between the two filters and thus to outer filter 52.

The effect of this bypass flow is the same as has been described in connection with FIGS. 5 and 6.

Figure 10:
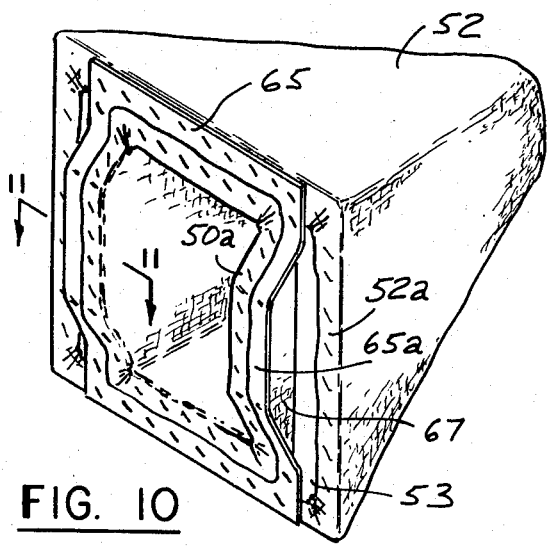
FIG. 10 is a modification of a filter assemblage including a bypass.
Figure 11:
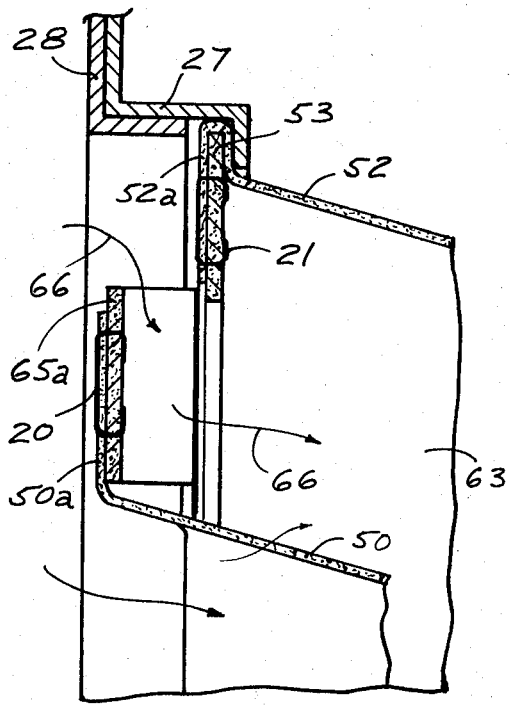
FIG. 11 is a fragmentary section taken on line 11—11 of FIG. 10 on an enlarged scale.

FIGS. 10 and 11 show a filter assemblage in which the bypass leading directly to outer filter 52 via air space 63 is obtained by securing a turned over rim portion 50a of inner filter 50 to a frame 65, a portion 65a of which is concavely curved in reference to the flat surface of frame 53 for outer filter 52 secured to its frame by a turned over rim portion 52a.

As is evident and indicated in FIG. 11 by arrows 66, the curved portion 65a of frame 65 in conjunction with flat frame 53 defines a bypass conduit 67 for diverting part of the total air flow thereby obtaining the distribution of the total flow described in connection with FIGS. 5 and 6.

Figure 12:
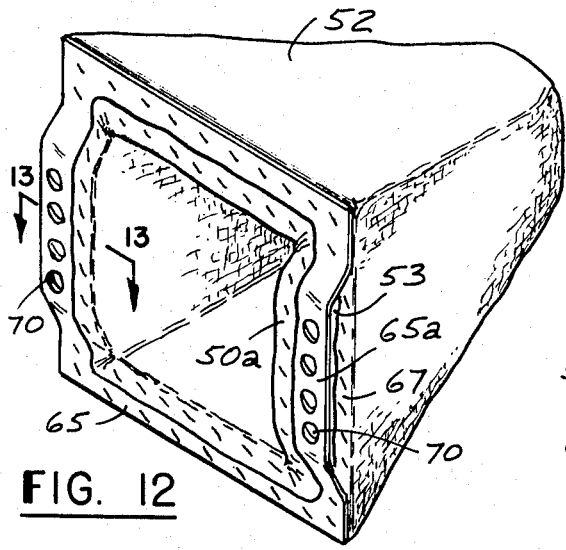
Figure 13:
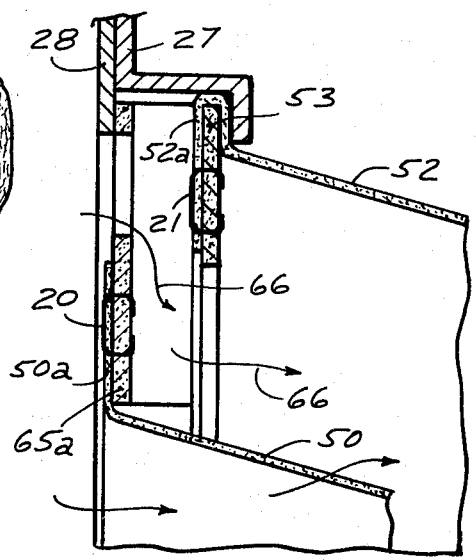
FIG. 13 is a sectional view along line 13—14 of FIG. 12 on an enlarged scale.

FIGS. 12 and 13 are very similar to FIGS. 10 and 11. Accordingly, the same reference numerals are used to designate corresponding parts.

The filter assemblage according to FIGS. 12 and 13 is distinguished from the filter assemblage of FIGS. 10 and 11 in that ports 70 are provided in the curved portions 65a of frame 65 to increase the bypass flow through bypass conduit 67.

What is claimed is:
1. A filter assemblage for separating discrete particles entrained in a gaseous fluid flow, said filter assemblage comprising in combination:
   an inner generally bag-shaped filter made of soft air permeable material and having an open intake end;
   an outer generally bag-shaped filter made of soft air permeable material and having an open intake end;
   a first frame secured to the intake end of the inner filter to frame an intake opening for the inner filter; and
   a second frame secured to the intake end of the outer filter to frame an intake opening for the outer filter; said inner filter being nested in said outer filter defining an air space therebetween, the frames secured to the filters being disposed in super-imposition to retain said filters in the nested position and to permit withdrawal of the inner filter with the first frame attached thereto from the outer filter, said first frame including an apertured frame portion spaced apart from the underlying opposite frame portion of the second frame to define a space therebetween, the remaining portions of the first frame being in abutment with the underlying opposite portions of the second frame thereby forming a bypass flow path through said apertured frame portion and said space into said air space between the outer filter and the inner filter.

2. A filter assemblage according to claim 1 wherein said frames have substantially rectangular outer and inner peripheral outlines, the inner peripheral outline of the intake opening of the first frame being smaller than that of the second frame, the apertured portion of the first frame and the underlying spaced-apart frame portion of the second frame thereby defining a duct leading into said air space.

3. A filter assemblage according to claim 2 wherein said apertured frame portion is formed by a side wall of the first frame concavely curved in reference to the second frame and disposed intermediate the respective corners of the first frame.

4. A filter assemblage according to claim 2 and comprising a flat holding frame having at its inner peripheral outline a peripheral flange normal to the plane of the frame and terminating in an inwardly turned shoulder, the rim of said second frame and the rim of the outer filter attached thereto being seated on said shoulder, and a cover plate having an intake opening exposing said apertured frame portion detachably fastened to said holding frame on the side thereof opposite to said flange for retaining the first frame and the second frame in said holding frame.

5. A filter assemblage according to claim 1 wherein the outer filter has a higher density than the inner filter.

References Cited
UNITED STATES PATENTS

| | | | |
|---|---|---|---|
| 540,720 | 6/1895 | Clark | 55—341 |
| 1,813,226 | 7/1931 | Birdsall | 210—338 X |
| 2,467,503 | 4/1949 | Scriven | 55—377 X |
| 2,605,858 | 8/1952 | Lang | 55—372 X |
| 2,688,379 | 9/1954 | Anderson | 55—372 |
| 2,721,624 | 10/1955 | Osborn | 55—380 X |
| 2,833,372 | 5/1958 | Lappin et al. | 55—376 |
| 2,853,154 | 9/1958 | Rivers | 55—341 |
| 2,865,465 | 12/1958 | Lachowciz | 55—380 X |
| 2,975,863 | 3/1961 | Sosnowich | 55—381 |
| 3,034,273 | 5/1962 | Wallace | 55—467 X |
| 3,172,743 | 3/1965 | Kowalewski | 55—214 |
| 3,204,391 | 9/1965 | Schwab | 210—338 X |
| 3,236,033 | 2/1966 | Thompson | 55—309 |

HARRY B. THORNTON, *Primary Examiner.*

DENNIS E. TALBERT, JR., *Assistant Examiner.*

U.S. Cl. X.R.

55—376, 378, 380, 484, 487; 210—315, 338, 342; 229—53